(12) United States Patent
Wang

(10) Patent No.: US 8,819,667 B2
(45) Date of Patent: Aug. 26, 2014

(54) APPARATUS AND METHOD FOR MANAGING SUBSCRIBED DATA PLAN OF COMMUNICATION DEVICE

(71) Applicant: Peng Wang, Shenzhen (CN)

(72) Inventor: Peng Wang, Shenzhen (CN)

(73) Assignees: Fu Tai Hua Industry (Shenzhen) Co., Ltd., Shenzhen (CN); Hon Hai Precision Industry Co., Ltd., New Taipei (TW)

( * ) Notice: Subject to any disclaimer, the term of this patent is extended or adjusted under 35 U.S.C. 154(b) by 114 days.

(21) Appl. No.: 13/657,906

(22) Filed: Oct. 23, 2012

(65) Prior Publication Data

US 2013/0263109 A1 Oct. 3, 2013

(30) Foreign Application Priority Data

Apr. 3, 2012 (CN) .......................... 2012 1 0095706

(51) Int. Cl.
*G06F 9/44* (2006.01)
(52) U.S. Cl.
USPC ......................................................... 717/171

(58) Field of Classification Search
USPC ......................................................... 717/171
See application file for complete search history.

(56) References Cited

U.S. PATENT DOCUMENTS

| 7,707,573 | B1 * | 4/2010 | Marmaros et al. ............ 717/178 |
| 8,484,568 | B2 * | 7/2013 | Rados et al. .................. 715/745 |
| 2012/0210313 | A1 * | 8/2012 | Cooley et al. ................. 717/171 |
| 2013/0198373 | A1 * | 8/2013 | Zalmanovitch et al. ...... 709/224 |
| 2014/0068212 | A1 * | 3/2014 | Lin et al. ....................... 711/162 |

* cited by examiner

*Primary Examiner* — Philip Wang
(74) *Attorney, Agent, or Firm* — Novak Druce Connolly Bove + Quigg LLP

(57) ABSTRACT

A method for managing subscribed data plan of a communication device, the data plan includes a predetermined amount of Internet traffic for connecting the Internet. An end date of the subscribed data plan is set, and a time for querying residual data of the subscribed data plan is determined according to the end date. The residual data of the subscribed data plan is queried when the determined time is reached. Applications, of the communication device, which are to be updated are detected, and one or more of the detected applications are updated using the residual data of the subscribed data plan of the communication device.

19 Claims, 3 Drawing Sheets

APPARATUS AND METHOD FOR MANAGING SUBSCRIBED DATA PLAN OF COMMUNICATION DEVICE

BACKGROUND

1. Technical Field

Embodiments of the present disclosure relate to the field of mobile communication technologies, and in particular, to an apparatus and method for managing subscribed data plan of a communication device.

2. Description of Related Art

Many users subscribe to a predetermined data plan including a predetermined amount of Internet traffic within a predetermined period when connecting to the Internet using their mobile devices. For example, a user may subscribe to a monthly Internet package service and may enjoy a total of 1000 MB every month. However, the data of the subscribed data plan may not be used up before end of each month. Therefore, there is room for improvement in the art.

DETAILED DESCRIPTION

The disclosure, including the accompanying drawings, is illustrated by way of example and not by way of limitation. It should be noted that references to "an" or "one" embodiment in this disclosure are not necessarily to the same embodiment, and such references mean "at least one."

Figure 1:
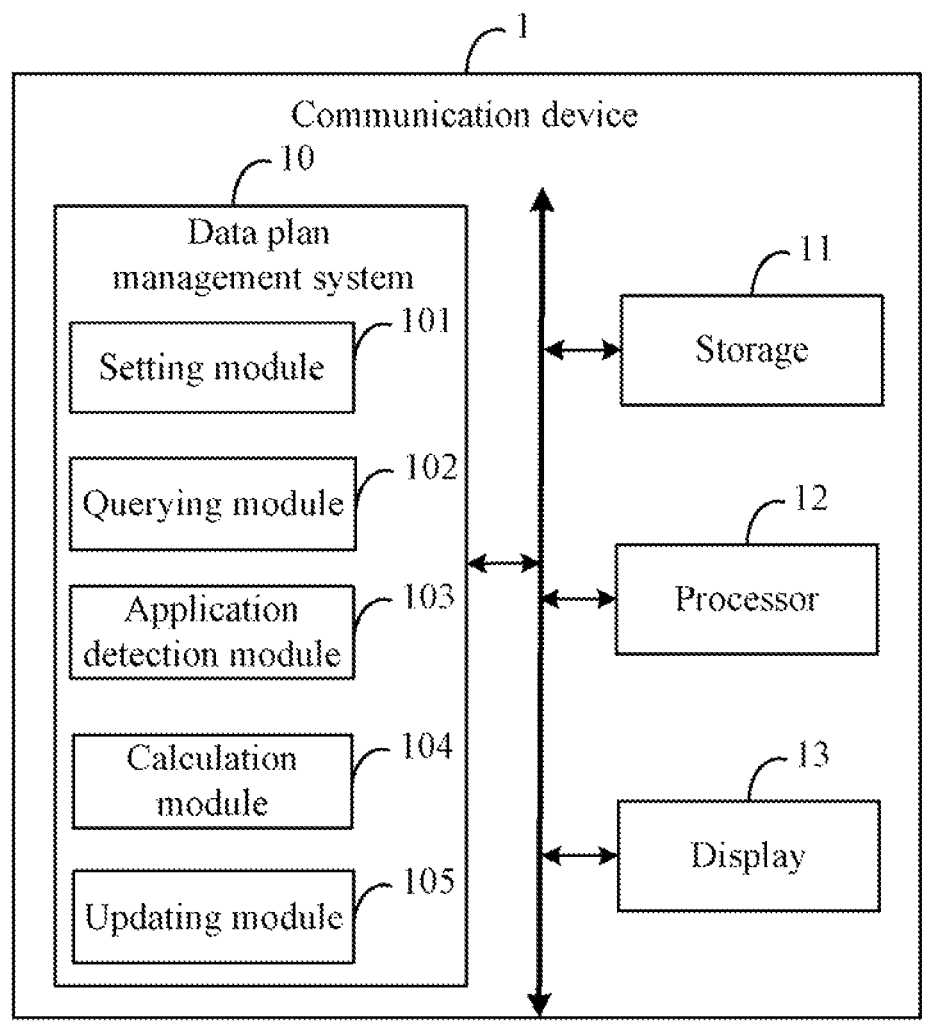
FIG. 1 is a schematic block diagram illustrating one embodiment of a communication device.

FIG. 1 is a schematic block diagram illustrating one embodiment of a communication device 1. The communication device 1 includes a data plan management system 10, a storage 11, a processor 12, and a display 13. In the embodiment, data plan including a predetermined amount of Internet traffic (e.g., 1000 MB) within a limited time period (e.g., a month) is subscribed to for the communication device 1. The communication device 1 may be, for example, a mobile phone, a mobile internet device, or other similar mobile devices. FIG. 1 shows one example of the communication device 1, and the communication device 1 can include more or fewer components than those shown in the embodiment, or have a different configuration of the components.

The data plan management system 10 may include a plurality of programs in the form of one or more computerized instructions executed by the processor 12 to perform operations of the communication device 1. In the embodiment, the data plan management system 10 includes a setting module 101, a querying module 102, an application detection module 103, a calculation module 104, and an updating module 105. In general, the word "module," as used herein, refers to logic embodied in hardware or firmware, or to a collection of software instructions, written in a programming language, such as, Java, C, or assembly. One or more software instructions in the modules may be embedded in firmware, such as in an erasable programmable read only memory (EPROM). The modules described herein may be implemented as either software and/or hardware modules and may be stored in any type of non-transitory computer-readable medium or other storage devices. Some non-limiting examples of non-transitory computer-readable medium include CDs, DVDs, BLU-RAY, flash memory, and hard disk drives.

The setting module 101 sets an end date (e.g., the last day of each month) of the limited time period for the subscribed data plan, and determines a time (e.g., two or three hours before the end date is elapsed) for querying a residual data of the subscribed data plan according to the end date. In one embodiment, the setting module 101 may display an input interface on the display 13, and notify a user to input the end date through the input interface. In another embodiment, the setting module 101 may activate a calendar application of the communication device 1, and notify the user to select a date from a user interface of the calendar application. Then, the selected date is defined as the end date.

The querying module 102 queries the residual data of the subscribed data plan of the communication device 1 when the determined time is reached, and determines whether the residual data of the subscribed data plan is greater than a predetermined value, such as 5 MB. In the embodiment, the querying module 102 may send a query message (e.g., a text message) having a predetermined format to a service terminal of a mobile communication company to query the residual data of the subscribed data plan of the communication device.

The application detection module 103 detects which installed applications of the communication device 1 are to be updated if the residual data of the subscribed data plan of the communication device 1 is greater than the predetermined value. In the embodiment, the application detection module 103 may detect the applications are to be updated using an updating tool/function of each of the applications. Thereupon, the updating module 105 updates one or more of the detected applications using the residual data of the subscribed data plan.

In one embodiment, before the updating of any applications, the application detection module 103 may first determine an amount of Internet traffic that is required for updating each of the detected applications, and the calculation module 104 may calculate a sum of the Internet traffic that is needed for updating each of the detected applications to determine whether the residual data of the subscribed data plan is enough to update each of the detected applications.

Figure 3:
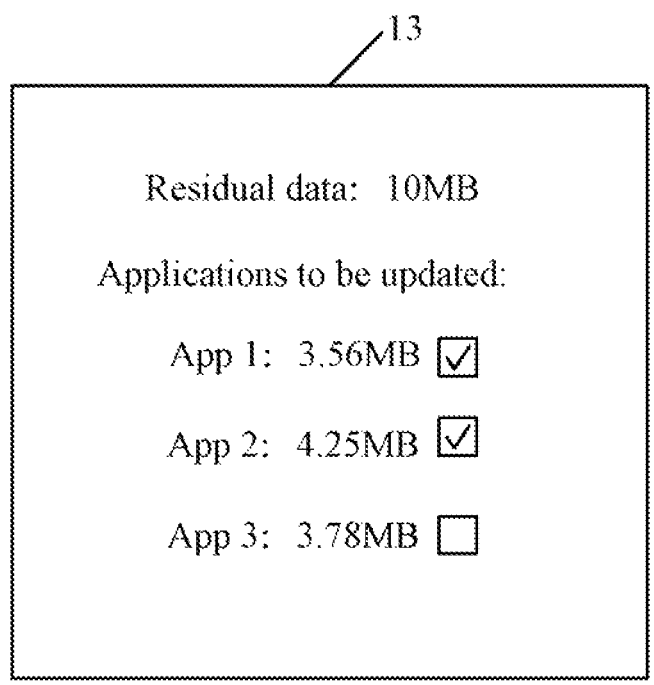
FIG. 3 is a schematic diagram of an example of notifying a user to select one or more applications to update.

If the residual data of the subscribed data plan is enough to update each of the detected applications, the updating module 105 updates each of the detected applications in sequence using the residual data of the subscribed data plan. If the residual data of the subscribed data plan is not enough to update each of the detected applications, the updating module 105 may selectively update one or more of the detected applications. In one embodiment, as shown in FIG. 3, the updating module 105 may display each of the detected applications on the display 13, and notifies the user to select one or more of the displayed applications. Then, the updating module 105 updates the one or more of the detected applications according to the selection of the user.

In another embodiment, the update module 105 may determine a priority level for each of the detected applications of the communication device 1. For example, the priority level of each of the detected applications can be determined according to a usage frequency of each application. The application which has a higher usage frequency may have a higher priority level. The updating module 105 may update the detected applications in sequence according to the priority level of each detected application, until the residual data of the data plan of the communication device 1 is not enough to update any of the detected applications.

Figure 2:
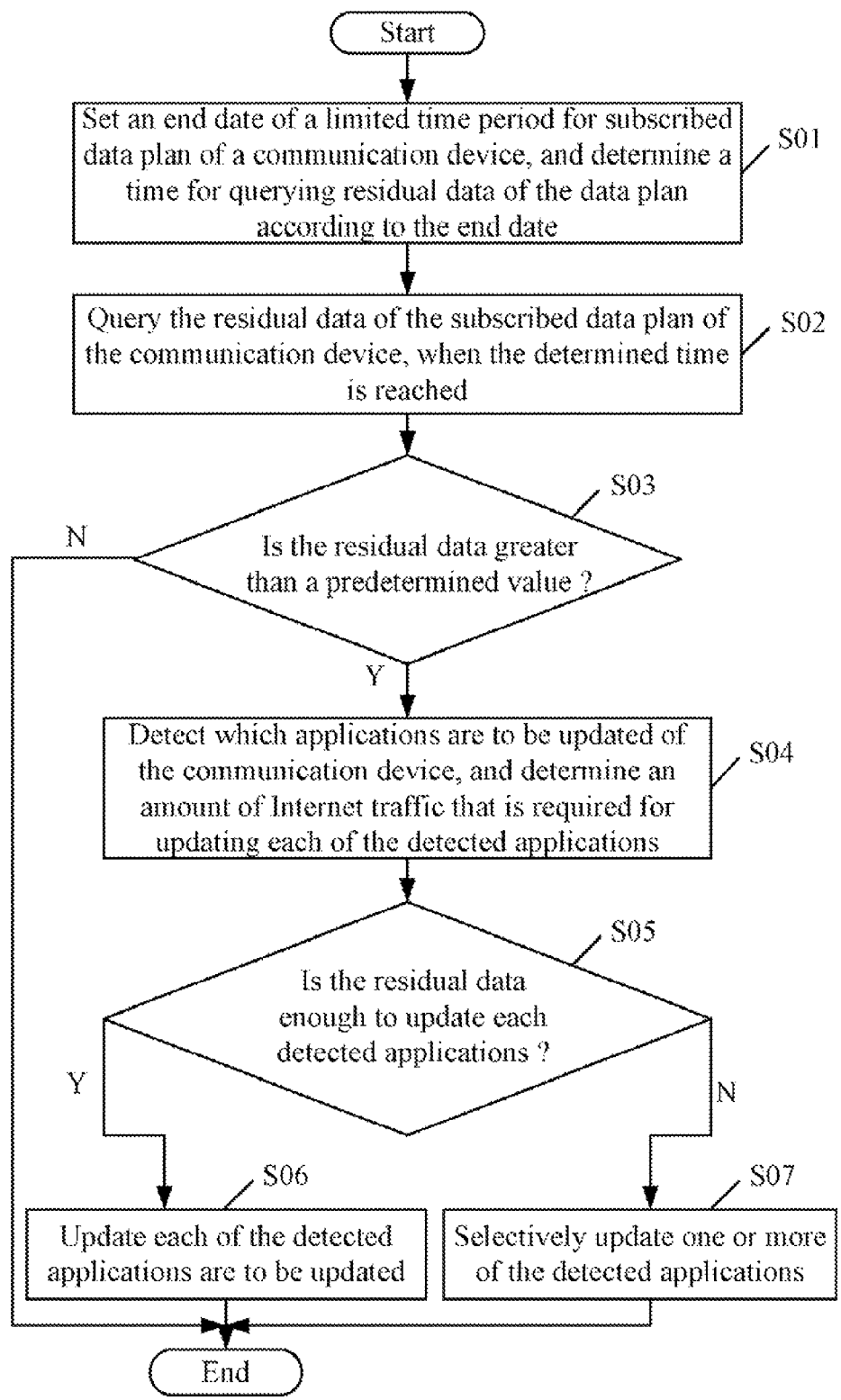
FIG. 2 is a flowchart of one embodiment of a method for managing subscribed data plan of the communication device of FIG. 1.

FIG. 2 shows a flowchart of one embodiment of a method for the subscribed data plan of the communication device 1 of FIG. 1. Depending on the embodiment, additional steps may be added, others removed, and the ordering of the steps may be changed.

In step S01, the setting module 101 sets an end date of the limited time period for the subscribed data plan of the communication device 1, and determines a time for querying a residual data of the subscribed data plan according to the end date.

In step S02, the querying module 102 queries the residual data of the subscribed data plan of the communication device 1, when the determined time is reached.

In step S03, the application detection module 103 determines whether the residual data of the subscribed data plan is greater than a predetermined value. If the residual data of the subscribed data plan is greater than the predetermined value, the procedure goes to step S04. In step S04, the application detection module 103 detects which installed applications are to be updated of the communication device 1, and determines an amount of Internet traffic that is required for updating each of the detected applications. If the residual data of the subscribed data plan is equal to or less than the predetermined value, the procedure ends.

In step S05, the calculation module 104 calculates a sum of the Internet traffic that is needed for updating each of the detected applications, to determine whether the residual data of the subscribed data plan is enough to update each of the detected applications. If the residual data of the subscribed data plan is enough to update each of the detected applications, step S06 is implemented. Otherwise, if the residual data of the subscribed data plan is not enough to update each of the detected applications, step S07 is implemented.

In step S06, the updating module 105 updates each of the detected applications using the residual data of the subscribed data plan, and the procedure ends.

In step S07, the updating module 105 selectively updates one or more of the detected applications using the residual data of the subscribed data plan as described above.

Although certain embodiments of the present disclosure have been specifically described, the present disclosure is not to be construed as being limited thereto. Various changes or modifications may be made to the present disclosure without departing from the scope and spirit of the present disclosure.

What is claimed is:

1. A computerized method for managing subscribed data plan of a communication device, the data plan comprising a predetermined amount of Internet traffic within a limited time period, the method comprising:
    setting an end date of the limited time period for the subscribed data plan of the communication device, and determining a time for querying residual data of the subscribed data plan according to the end date;
    querying the residual data of the subscribed data plan of the communication device when the determined time is reached, and determining whether the residual data of the subscribed data plan is greater than a predetermined value;
    detecting which installed applications are to be updated of the communication device, when the residual data of the subscribed data plan is greater than the predetermined value; and
    updating one or more of the detected applications using the residual data of the subscribed data plan.

2. The method according to claim 1, further comprising:
    determining an amount of Internet traffic that is required for updating each of the detected applications; and
    calculating a sum of the Internet traffic that is needed for updating each of the detected applications, to determine whether the residual data of the subscribed data plan is enough to update each of the detected applications.

3. The method according to claim 2, wherein the updating step further comprises:
    updating each of the detected applications when the residual data of the subscribed data plan is enough to update each of the detected applications; or
    selectively updating one or more of the detected applications when the residual data of the subscribed data plan is not enough to update each of the detected applications.

4. The method according to claim 3, wherein the updating step comprises:
    displaying each of the detected applications on a display of the communication device, when the residual data of the subscribed data plan is not enough to update each of the detected applications;
    notifying a user to select one or more of the displayed applications for updating; and
    updating the one or more of the detected applications according to the selection of the user.

5. The method according to claim 1, wherein the updating step comprises:
    determining a priority level for each of the detected applications; and
    updating the detected applications in sequence according the priority level of each of the detected applications, until the residual data of the subscribed data plan of the communication device is not enough to update any of the detected applications.

6. The method according to claim 5, wherein the priority level of each detected application is determined according to a usage frequency of each detected application, and the application which has a higher usage frequency has a higher priority level.

7. The method according to claim 1, wherein the setting step comprises:
    activating a calendar application of the communication device;
    notifying a user to select a date from a user interface of the calendar application; and
    defining a date selected by the user as the end date.

8. The method according to claim 1, wherein the applications which are to be updated are detected using an updating tool/function of each application of the communication device.

9. The method according to claim 1, wherein the querying step further comprises:
    sending a message having a predetermined format to a service terminal of a mobile communication company to query the residual data of the subscribed data plan of the communication device.

10. A communication device that subscribes to data plan comprising a predetermined amount of Internet traffic within a limited time period, comprising:
    a display;
    a storage;
    a processor; and
    one or more programs stored in the storage and executed by the processor, the one or more programs comprising:
    a setting module that sets an end date of the limited time period for the subscribed data plan of the communication device, and determines a time for querying a residual data of the subscribed data plan according to the end date;

a querying module that queries the residual data of the subscribed data plan of the communication device when the determined time is reached, and determines whether the residual data of the subscribed data plan is greater than a predetermined value;

an application detection module that detects which installed applications are to be updated of the communication device when the residual data of the subscribed data plan is greater than the predetermined value; and an updating module that updates one or more of the detected applications of the communication device using the residual data of the subscribed data plan.

11. The communication device according to claim 10, wherein the application detection module further determines an amount of Internet traffic that is required for updating each of the detected applications.

12. The communication device according to claim 11, wherein the one or more programs further comprise:

a calculation module that calculates a sum of the Internet traffic that is needed for updating each of the detected applications to determine whether the residual data of the subscribed data plan is enough to update each of the detected applications.

13. The communication device according to claim 12, wherein the updating module updates each of the detected applications when the residual data of the subscribed data plan is enough to update each of the detected applications, or selectively updates one or more of the detected applications when the residual data of the subscribed data plan is not enough to update each of the detected applications.

14. The communication device according to claim 13, wherein the updating module further displays each of the detected applications on the display when the residual data of the subscribed data plan is not enough to update each of the detected applications, notifies a user to select one or more of the displayed applications for updating, and updates the one or more of the detected applications according to the selection of the user.

15. The communication device according to claim 13, wherein the updating module further determines a priority level for each of the detected applications, and updates the detected applications in sequence according the priority level of each of the detected applications until the residual data of the subscribed data plan of the communication device is not enough to update any of the detected applications.

16. The communication device according to claim 15, wherein the priority level of each detected application is determined according to a usage frequency of each detected application, and the application which has a higher usage frequency has a higher priority level.

17. The communication device according to claim 10, wherein the end date is set by:

activating a calendar application of the communication device;

notifying a user to select a date from a user interface of the calendar application; and defining a date selected by the user as the end date.

18. The communication device according to claim 10, wherein the applications which are to be updated are detected using an updating tool/function of each application of the communication device.

19. The communication device according to claim 10, wherein the querying module further sends a message having a predetermined format to a service terminal of a mobile communication company to query the residual data of the subscribed data plan of the communication device.

* * * * *